March 15, 1949.  J. S. PECKER  2,464,651
BOUNDARY LAYER CONTROL AND AIR COMPRESSOR
FOR ROTARY WING AIRCRAFT
Filed July 11, 1944  6 Sheets-Sheet 3
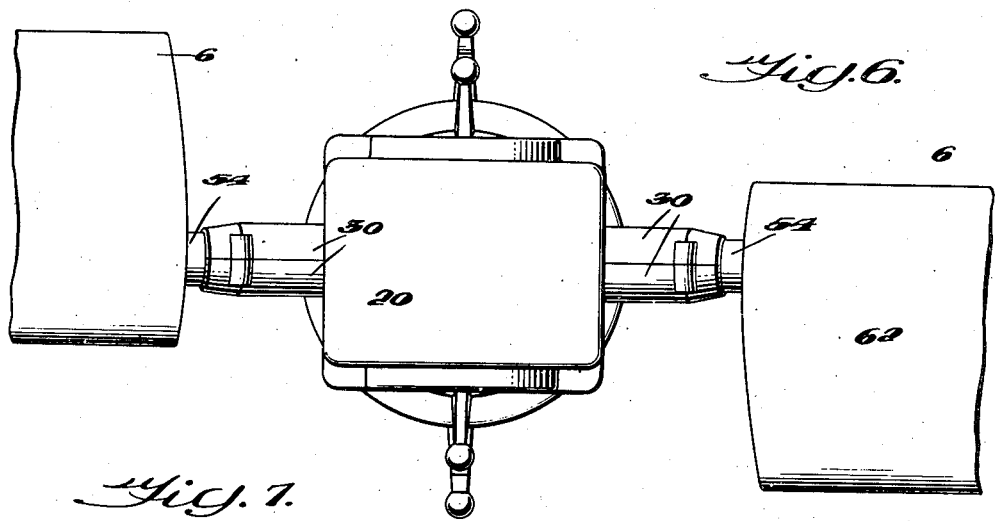
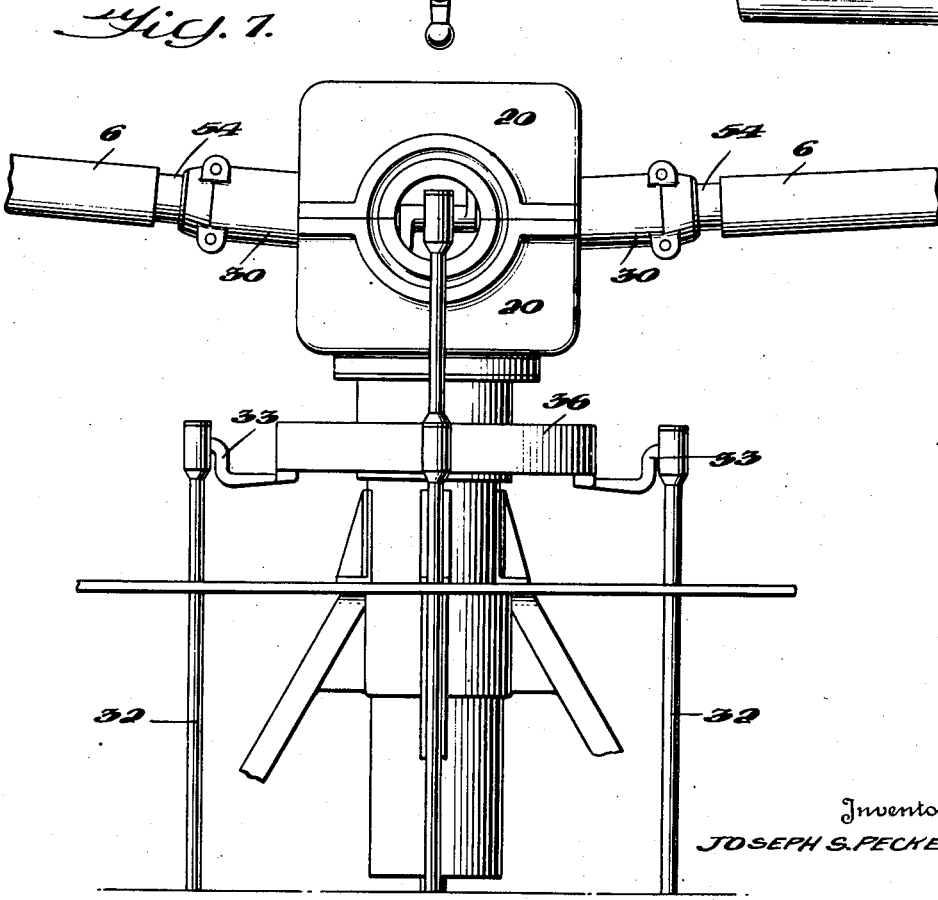
Inventor
JOSEPH S. PECKER,
By Mason & Hatfield
Attorneys

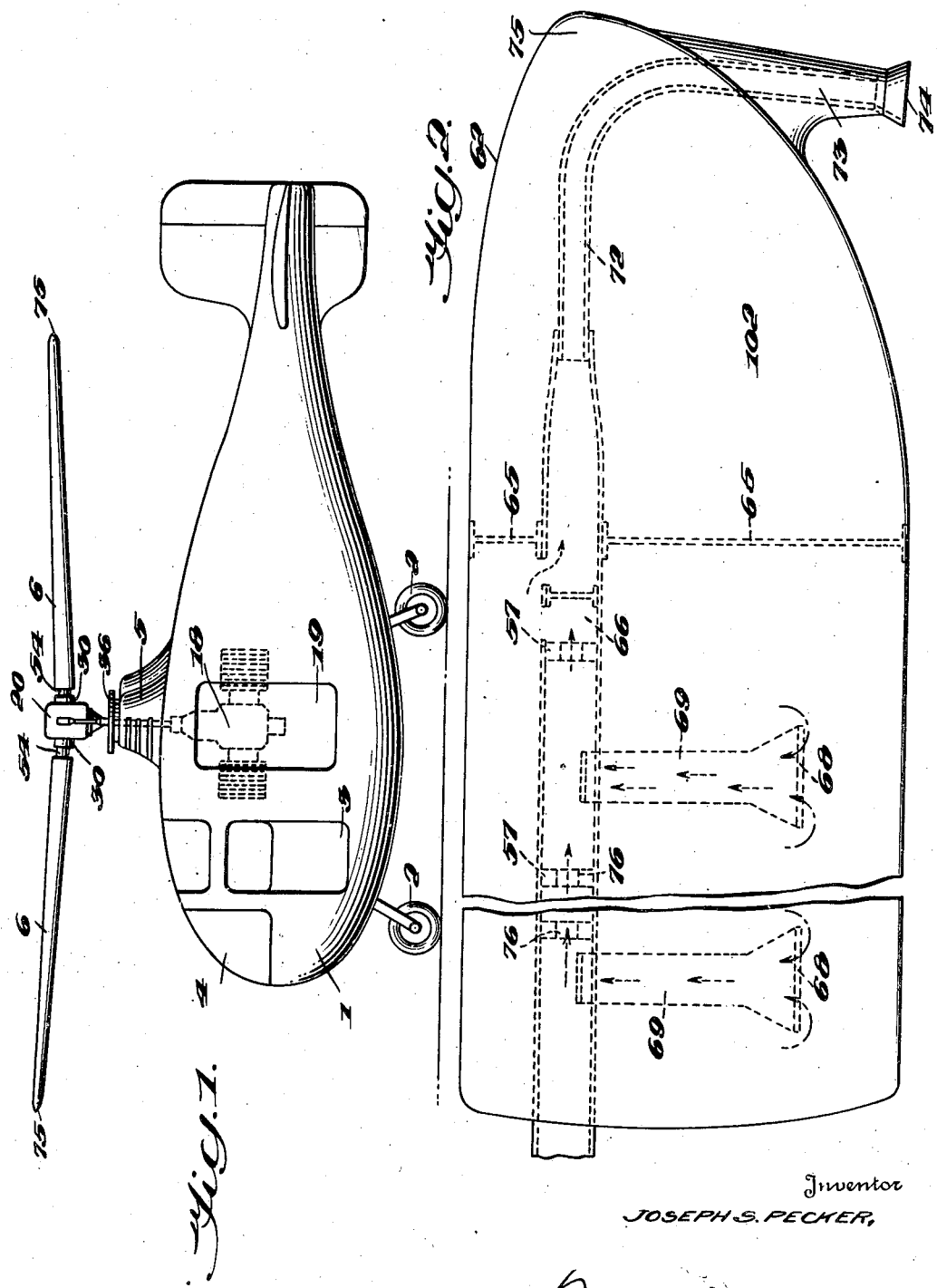

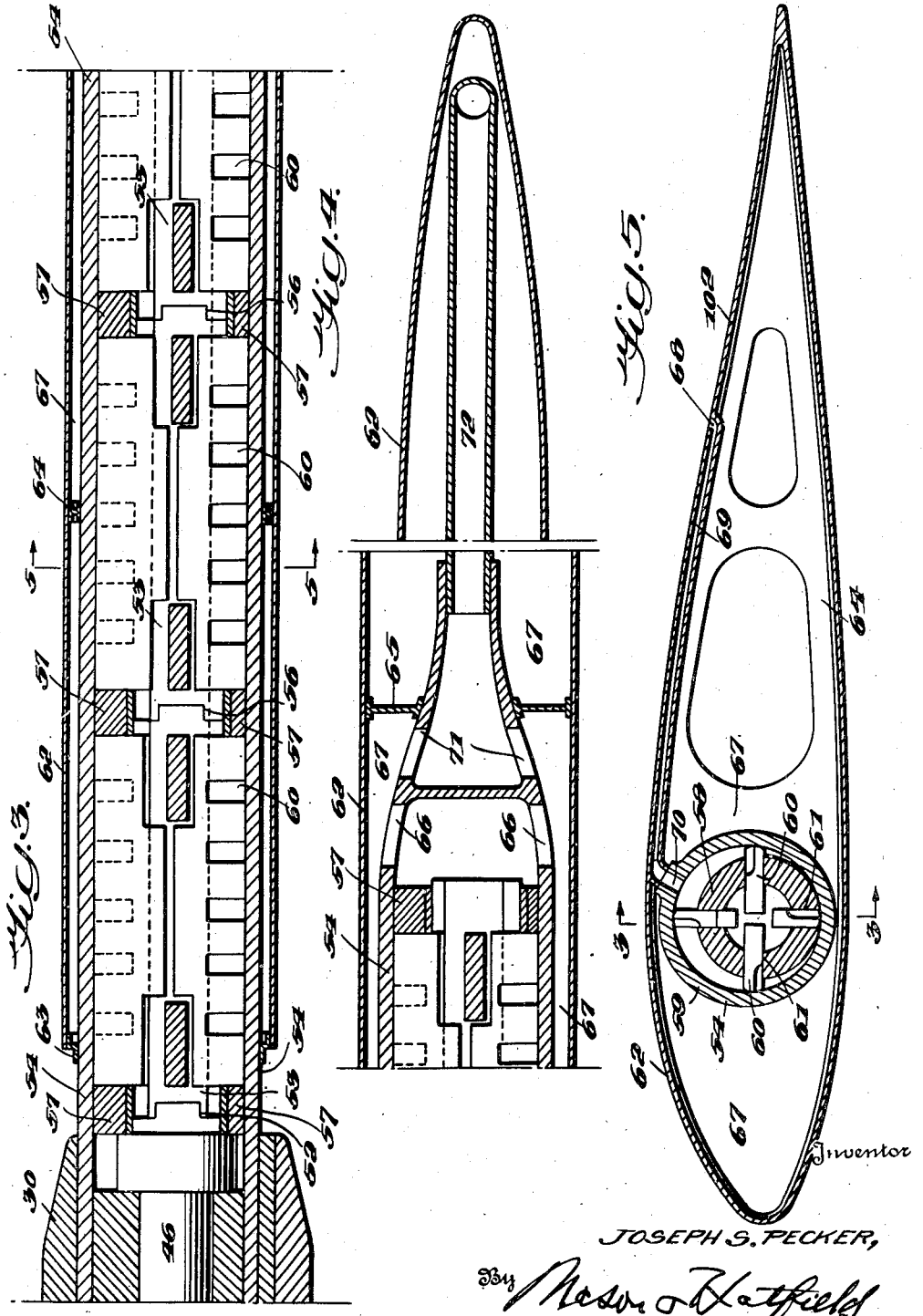

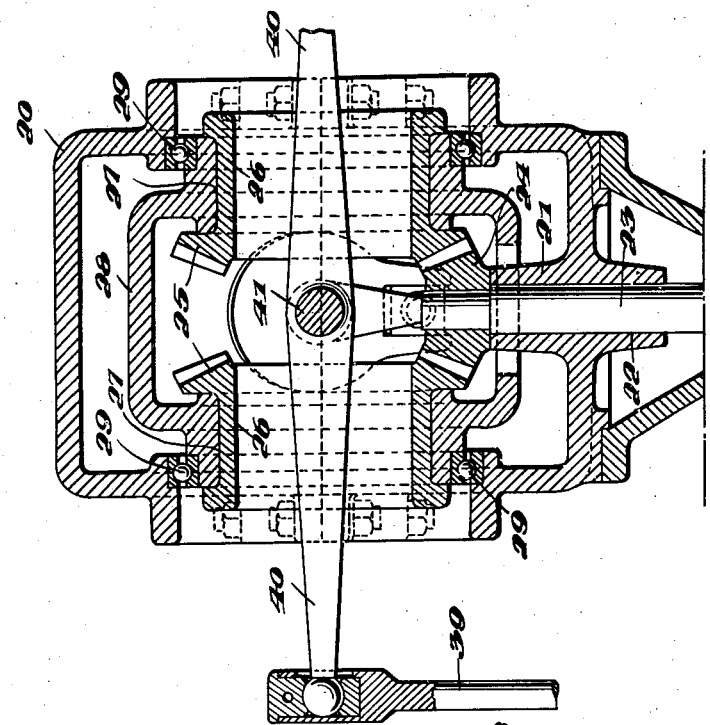
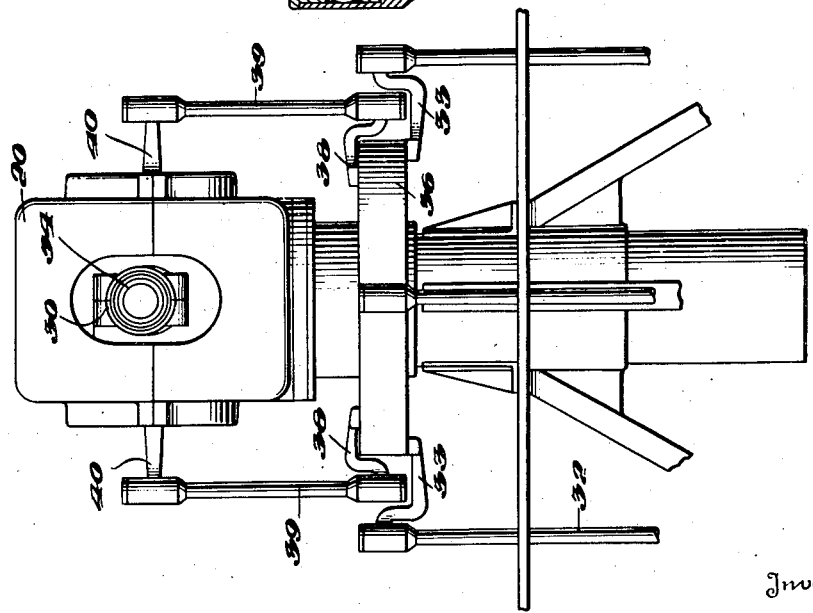

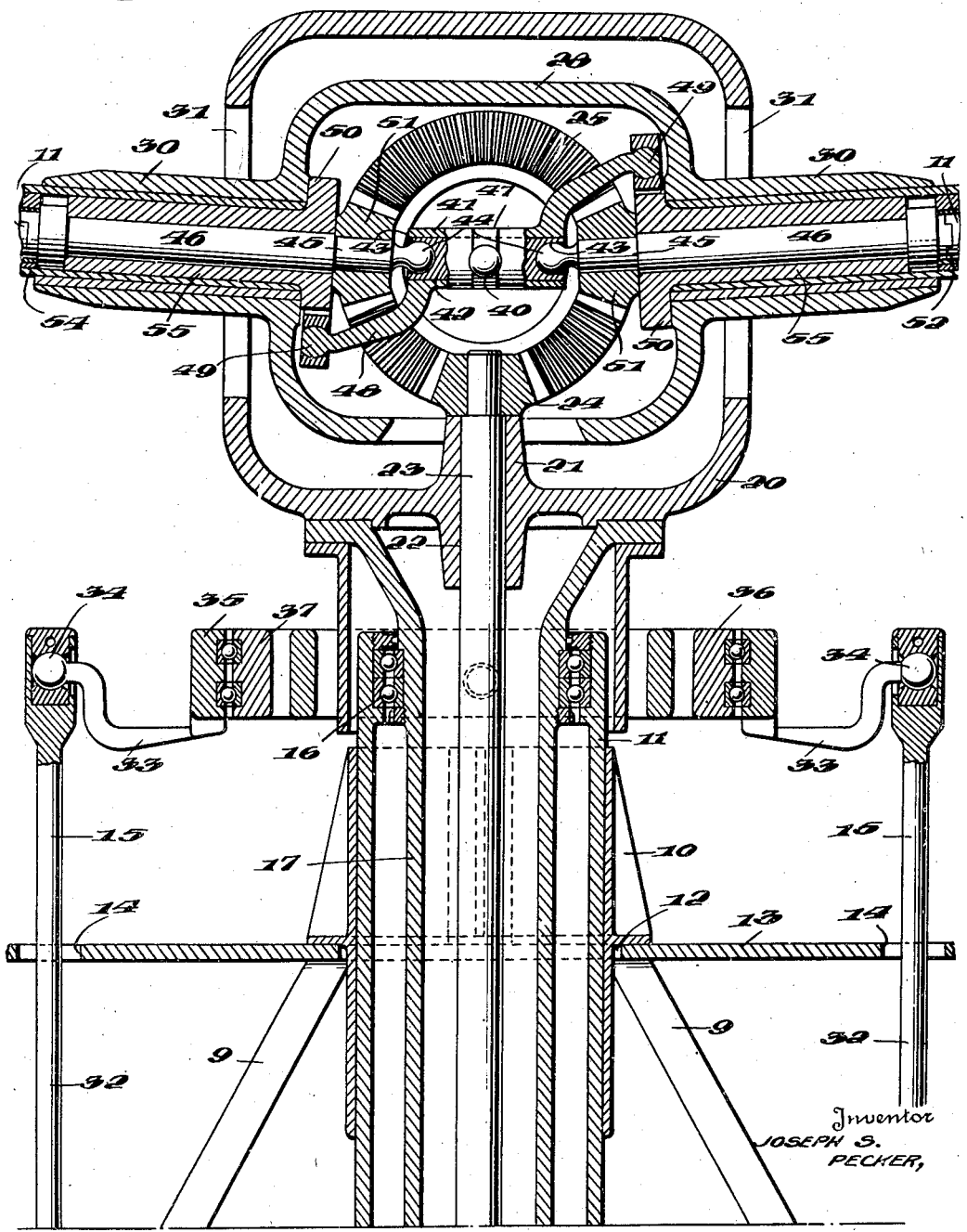

March 15, 1949. J. S. PECKER 2,464,651
BOUNDARY LAYER CONTROL AND AIR COMPRESSOR
FOR ROTARY WING AIRCRAFT
Filed July 11, 1944 6 Sheets-Sheet 6

Inventor
JOSEPH S. PECKER,

By Mason & Hatfield
Attorneys

Patented Mar. 15, 1949

2,464,651

UNITED STATES PATENT OFFICE 2,464,651

BOUNDARY LAYER CONTROL AND AIR COMPRESSOR FOR ROTARY WING AIRCRAFT

Joseph S. Pecker, Philadelphia, Pa.

Application July 11, 1944, Serial No. 544,407

11 Claims. (Cl. 170—135.4)

1

This invention relates to rotary wing aircraft wherein the sustaining force for the aircraft is furnished by the rotating wings.

An object of the invention is to provide a rotary wing aircraft employing a plurality of blades mounted to rotate above the cabin or fuselage of the aircraft, wherein the blades are provided with mechanism located within the interior of the blade for compressing air, and air jet propulsion.

The invention further contemplates the provision in such rotary wing aircraft of means for storing compressed air in chambers arranged in one or more of the blades.

Another object of the invention is to provide an aircraft having a plurality of blades forming the rotary wing, some of the blades being provided with compressing means for compressing air and for causing rotation of said blades by the reaction air jet principle.

A further object of the invention is to improve the construction of rotary wing aircraft by the provision within each of the hollow blades thereof, of a storage space forming a tank, an ejection means, and a compressing means, to thereby provide a reaction propelled blade, and whereby to increase the efficiency of such reaction propelled blade by eliminating pipes of considerable length leading from a tank in the fuselage to the tip of the blade.

It is further contemplated by this invention to provide a rotary wing aircraft having in one or more of its blades a pump, and means adjacent said pump for causing reaction propulsion of the blade.

A still further object of the invention is to provide a compact air compressor, a storage chamber and reaction propulsion means for one or more of the blades of the rotary wing, without changing the shape of the blades over the conventional blade used in this type of aircraft.

An additional object is to utilize the interior of the blades as a chamber for compressing air, and to thereby decrease the overall weight of the aircraft, by eliminating a tank in the cabin.

A further object of the invention is to provide a rotary wing aircraft, one or more blades of which are provided within the interior thereof with a compressor, a storage chamber in close proximity thereto, and a propulsion jet outlet in close proximity to the storage chamber, to thereby provide for utilization of compressed air for propulsion purposes in the most efficient manner.

Still a further object of the invention is to provide a rotary wing blade, said rotary wing blade having a barrel or cylinder forming part of an air compressor, and to use this generated pressure in a reaction jet near the tip of the said blade to thereby cause rotation of the rotary wing.

Still another object of the invention is to provide in the heretofore enumerated structure,

2 mechanism for controlling the pitch angle of the blades, such last named mechanism including means for adjusting the blades about their longitudinal axes to cause cycle or mean pitching of the blades.

It is further contemplated by this invention to provide in a rotary wing aircraft, means for removing the boundary layer air from the upper surface of each blade and utilizing the air so removed in the reaction propulsion of the blade.

A still further object of this invention is to provide an aircraft of the type described having a pump located within the wing blade for removing the boundary layer from the blade.

Further objects and advantages will appear through the specification.

In the drawings:

Figure 1 is a diagrammatic side elevational view of a rotary wing aircraft provided with the present invention;

Figure 2 is a plan view of one of the blades partly broken away and showing the reaction propulsion jet on the end of the blade;

Figure 3 is a vertical section of one of the wing blades partly broken away, and taken on the line 3—3 of Figure 5;

Figure 4 is a vertical sectional view partly broken away showing a blade and the blade end or tip, and taken at right angles to the section shown in Figure 3;

Figure 5 is a vertical section of the wing blade shown in Figure 3, and taken on the line 5—5 of Figure 3;

Figure 6 is a plan view of the hub and blades, certain of the controls being omitted;

Figure 7 is a side elevational view of the structure disclosed in Figure 6 with the addition of the control for the blades;

Figure 8 is a side elevational view of the structure shown in Figure 7, and taken at right angles thereto;

Figure 9 is a vertical sectional view of the hub;

Figure 10 is a vertical sectional view of the hub shown in Figure 9, taken at right angles thereto, and further disclosing the swash plate and controls therefor.

General Description

Figure 11:
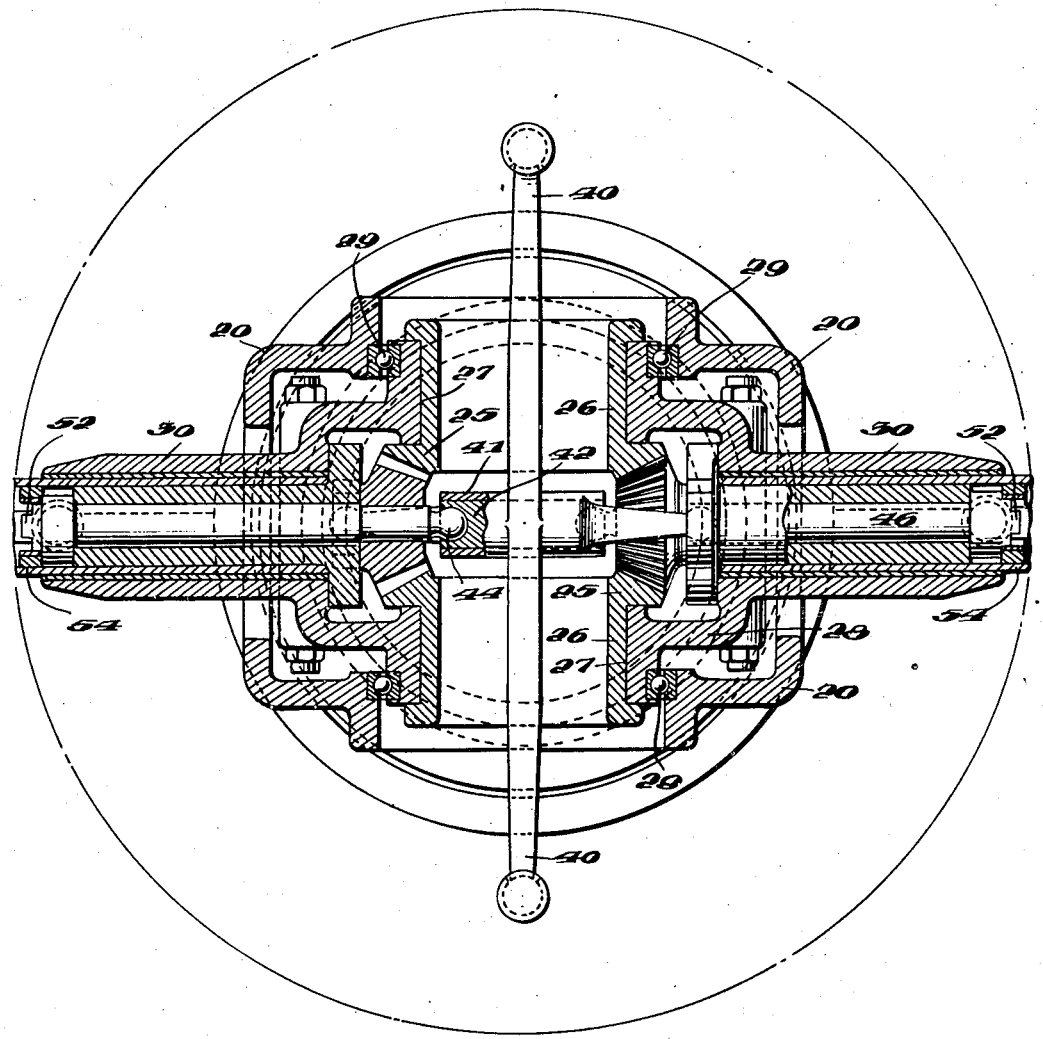
Figure 11 is a horizontal sectional view of the hub taken on the line 11—11 of Figure 10.

In the present invention, a source of power is located preferably within the cabin or fuselage, and back of the pilot's seat. Such power source is connected to drive a plurality of air pumps, each of which air pumps is located within the interior of each of the wing blades. Such blades have one or more air inlets provided for the pump, the air inlets being so located as to withdraw air from the upper surface of its wing blade, thereby removing the boundary layer of air on said surface. This air is drawn directly into the pump and after being compressed by the pump, is forced into an air reservoir or tank within each individual blade. The air reservoir is so located that it is between the pump and the wing tip. Air compressed by the pressure is therefore forced into the reservoir and from the reservoir finds its way by a short passageway to the reaction nozzle or jet located in the wing tip portion of the blade. Each blade may be provided with one or more reaction jets, and these reaction jets constitute means which causes rotation of each wing blade. Combined with this means for rotating the wing blades are means to control the pitch angle of the wing blades whereby individual as well as unison pitching may be obtained from separate controls leading to the pilot's seat, and such pitch control means may be operated to cause either individual or unison pitching of the wing blades without affecting in any way the power driving connections to the several compression units located in the wing blades.

In the drawings, as shown in Figure 1, the aircraft is provided with a cabin or fuselage indicated at 1, supporting wheels 2, a door 3, observation window 4, and pylon 5. A pair of rotating blades 6 are shown, but it is to be distinctly understood that any number of these blades 6 may be used. These blades constitute the rotating wing. The blades 6 are provided with a pair of supporting shafts 30 and 54.

Pitch control mechanism

As indicated in Figure 10 there are a plurality of braces 9 fastened to the top of the fuselage structure or to the pylon, which braces terminate in a collar 10 which surrounds the stationary sleeve 11. The collar 10 is provided with a circular depression 12 for the support of a plate 13 having apertures 14 which serve to guide the control rods 15 hereinafter described, that extend into the cabin and adjacent the pilot's seat.

The upper end of the sleeve 11 is provided with antifriction bearings 16 which serve to support the rotor hub shaft 17. This shaft 17 may be driven directly by the engine 18 shown in Figure 1, or it may merely serve as a support for the rotary hub, which rotary hub is driven by reaction driven blades powered by the pumps located within the several blades 6. In other words, it is to be understood that while I may connect the shaft 17 in driving relation with the engine 18, the operation of the present invention does not necessarily include the connection of the shaft 17 in direct driving relation with the engine 18.

Access to the engine 18 may be had through a removable or hingedly connected door 19, shown in Figure 1. Rigidly connected with the hub shaft 17 is the rotor hub two-part or split outer shell 20, which, as shown in Fig. 7, is constructed for use with only a pair of blades 6 in the present construction. The lower part of the outer shell is provided with a trunnion 21 forming a bearing 22 for the inner shaft 23, which latter is either in direct driving connection with the engine 18, or it may be driven through suitable drive connections including a clutch and gearing (not shown). The upper end of the shaft 23 is provided with a driving pinion 24 which meshes with a pair of ring gears 25. These ring gears have sleeve bearings 26 in bearing engagement with the inner surfaces 27 of the inner two-part or split shell 28, which latter is supported, as shown in Figures 9 and 11, by anti-friction bearings 29 within the outer shell 20. The inner shell therefore and all parts supported thereby, may rotate with relation to the outer shell, and also the gears 25 may rotate with relation to the inner shell.

By reference to Figures 10 and 11, it will be noted that the inner shell 28 is provided with two sleeve supports which extend through enlarged openings 31 of the outer shell 20. These form the supports for the blade carrying shafts. As indicated in Figures 7, 8 and 10, it will be noted that there are four control rods 32 which extend into the fuselage for operation by the pilot. The upper ends of these control rods, particularly shown in Figure 10, are connected to lower brackets 33 by ball and socket joints 34. The inner end of these brackets is rigidly connected to the outer ring 35 of the swash plate, generally designated 36, which has an inner ring 37. As indicated in Figure 8, the inner ring 37 has connected to it the upper brackets 38 whose outer ends are connected to upper control rods 39 by ball and socket joints, not shown, similar to those indicated in Figure 10. Adjacent the tops of these upper control rods there are additional ball and socket joints, by which these rods are connected to the lever 40, which, as indicated in Figures 10 and 11, is rigidly connected centrally thereof to the sleeve 41. Freely rotatable in this sleeve and forming a bearing therefor, is the stub shaft 42 having sockets 43 at each end thereof for the reception of the ball supports 44. These latter are mounted on the reduced shaft ends 45 of the compressor drive shaft 46, to be hereinafter described. The sleeve 41 and the lever 40 may rotate relative to the stub shaft 42, due to the frictional engagement thereof.

The sleeve 41 is slotted at 47 to permit free relative movement of the sleeve 41 and lever 40 on the stub shaft 42. Adjacent each end of the sleeve 41 are curved arms 48 which have a ball and socket connection 49, and are eccentrically attached at said ball and socket connection 49 to disks 50, which are rigid with the wing spars 54.

It will be appreciated therefore that when the control rods 32 are operated by the pilot by pushing them either up or down, such control rods will tilt the swash plate, to cause one end to move down and the other end to move up within any point of the 360° circumference, causing the upper control rods to correspondingly move and to tilt or cause the blade pitch angle to change by means of the lever 40, sleeve 41, curved arms 48, and disk 50, which latter as stated heretofore, are rigidly connected with the wing spars. It will be noted that this operation causes the wing spars or blades to rotate in the same direction to cause what is termed cyclic pitching. Means for causing the disks to rotate in opposite directions to cause what is termed individual mean pitching, have not been shown, but it is to be understood that this may be attained by any one of a number of mechanisms disclosed in my co-pending application Ser. No. 544,548, filed July 14, 1944.

Compressor, boundary layer control and propulsion drive mechanism

Keyed to each reduced shaft end 45 is a pinion gear 51, which gears are in meshed relation with the ring gear 25, as indicated in Figure 11. Rotation of inner shaft 23 when driven by the engine 18, will cause rotation of each compressor drive shaft 46 regardless of the angular relationship of the shafts 46, i. e., their position with regard to the driving pinion 24. The outer end of each shaft 46, one for each blade, is provided with a splined drive 52 (Figures 3, 10, and 11), with the compressor shaft 53, forming the first unit of the compresser. A series of these pump units is longitudinally arranged within wing blades 6. Each spar 54 is rigidly connected to the disk sleeve 55. The wing spar 54, as indicated in Figures 3 to 5, forms the cylinder of the series of compresser units (Figure 3). Each compresser shaft 53 is connected to the next compresser shaft of the series by a splined drive 56, identical with the splined drives 52. The shafts 53 are suitably supported by spaced sleeves 57 having eccentric bearings for shafts 53, which engage the inner cylindrical walls of the wing spar 54.

Each pump unit is of the eccentric sliding vane type, as particularly shown in Figure 5, and wherein each compressor shaft 53 is eccentrically placed due to the eccentric shaft openings in the sleeves 57 with regard to spars 54, as shown at 58 and which contacts the inner cylindrical surface 59 of the wing spar 54. There are a series of vanes 60 which slide in slots 61 formed in the eccentric shaft portion 58. The skin 62 of each blade is suitably attached and supported on its wing spar 54 by strut members 63, 64 and 65. The strut member 63 forms a sealed connection between the skin 62 and wing spar 54.

The skin 62 forms a storage chamber for compressed air delivered from the several pump units. The upper skin portion 102 of each blade is provided with a series of apertures 68, Figure 2, and conduits 69 leading into the inlet openings 70, one for each pump unit. The apertures 68 are so placed that they will control the boundary layer on the upper skin surface 102 of the blade by moving air at the area of least pressure, as shown in Figures 2 and 5.

Air from the several pump units exhausts through the opening 66 into the space 67 (Figures 2 and 4), forming the individual storage chamber for each blade.

Compressed air from the tank 67 exits through the openings 71 into the exhaust pipe 72 and from the propulsion jet nozzle 73 located in the wing and having a rearwardly flaring opening 74, said jet nozzle being preferably located in the wing tip 75. It will be understood that the skin 62 is air-tight, so that the air pressure produced by the several pump units will build up within the space 67 forming the storage chamber.

The air removed will assist the boundary layer control which reduces turbulence on the upper surface of the skin 62, follows the arrows as indicated in Figure 2, the air first being drawn simultaneously into all of the pump units, where it is compressed by the pump units. Following its compression by said pump units it is forced through the central passageways 76 until the exit 66 is reached, where it is forced into the tank. From the tank, as also indicated by the arrow, the air under high pressure passes through the openings 71, exhaust pipe 72, and out through the flared end 74 of the propulsion jet nozzle 73.

The operation of the multistage pump of the blades of the rotary wing causes a high pressure to be built up in the chamber 67 and this air under pressure drives the rotary wing by the reaction propulsion principle, by ejection through the jets 73.

It will be noted that the tubular spar of each blade forms the barrel or cylinder for multiple air compresser units, and that the blade itself forms the tank for the air compressed by said compressers. It will be further noted that conduits leading from the air compressers to the storage chamber have been eliminated, and that the spar itself forms the cylinder for the several air compressers, and that the only conduit used is the conduit leading from the tank to the jet 73. Even this can be eliminated by merely providing an exit from the tank at the jet nozzle 73, thus doing away with the conduit 72. It is believed, however, that this conduit serves to strengthen and position the wing spar with relation to the wing tip.

It will also be noted that the compresser elements, propulsion drive mechanism, and other elements located within each blade do not interfere with the mechanism which is used for adjusting the blades about their longitudinal spar's axes. The mechanism of each wing tip and the drive therefor has been so constructed that the pitch angle of each blade may be adjusted by the mechanism disclosed in Figures 6 to 10 without interfering with the operation of the drive for the air compressers and the air compressers themselves. In fact, neither the propulsion drive mechanism nor the pitching mechanism, i. e., means for adjusting the angle of each blade about its longitudinal spar axis, interferes with the other.

By reference to the several figures, such as Figures 3 and 10, it will be noted that when the pitch adjustment is desired to be attained the swash plate is actuated, which causes the lever 40 to rock, thereby simultaneously rotating by means of the eccentric connection each disk 50, which through its sleeve 55 causes adjustment or rotation of the wing spar 54 and the skin 62 mounted thereon. This can occur simultaneously with the rotation of the shaft 23, pinion 24, ring gears 25, pinion gears 51, compresser drive shafts 46 connected thereto, and the eccentric shaft portions 58 of each compresser unit driven thereby. It will be further appreciated that by the present invention I have utilized the natural storage space within each blade as a chamber for compressed air, and have further used another portion of said space for a multistage compresser, thus eliminating long pipes leading from a tank in the fuselage to the tips of the wings, in a reaction jet propulsion device for a rotary wing aircraft. This structure results in a material reduction in the weight of the aircraft, and the location of the compresser within the wing spar, which latter is the chief supporting element for the blade, in close proximity to the storage chamber. The storage chamber is located immediately adjacent to the jet outlet and, therefore, provides a very efficient structure for a reaction jet propulsion blade. It will be particularly noted that the provision of a storage chamber into which is fed the air from the multiple stage compresser, entirely eliminates air pulsations emitted from the propulsion jet nozzle.

The provision of a propulsion jet rotary wing eliminates the necessity for the conventional anti-torque propeller now used on helicopters at the rear end of the cabin, and I have illustrated diagrammatically the conventional control element such as used on aircraft provided with the usual wing, the same being rigidly fixed to the fuselage of the plane.

While there has been shown a multiple stage compressor of a certain type, a single stage compressor may be substituted for that shown. It is to be further understood that other control means whereby blade pitching is attained, may be substituted for that shown and described herein.

It is to be further distinctly understood that the specification and the accompanying drawings are furnished for illustrative purposes only, and that the invention is capable of wide variations. I desire to be limited therefore only to the extent of the appended claims.

Having thus described my invention, what I claim is:

1. In a rotary wing aircraft of the propulsion jet type wherein the blades are provided with air compressing means, the combination of a hub, a plurality of hollow blades extending from said hub, means located within at least two of said blades for compressing air, means for driving said air compressing means, propulsion jet means on said last named blades communicating said air compressing means for causing said blade to rotate about a substantially vertical axis, means connected with said hub and said blades for changing the pitch angle of said blades during the compression of air by said air compressing means, said means for changing the pitch of said blades comprising a rotatable sleeve means carried by the blades which carry air compressing means and extending into the hub of said blades, said driving means extending vertically into said hub and being laterally extended at least partially through said sleeves and connected with said air compressing means.

2. In a rotary wing aircraft the combination of a source of power, a substantially vertical drive shaft extending therefrom, a plurality of blades adapted to rotate in a substantially horizontal plane, each blade having a wing spar, a pump in each of at least two of said blades, the wing spar in each of said last-named blades comprising the cylinder of said pump, means for driving each pump from said shaft, and means for simultaneously rotating each of said spars about their longitudinal axes whereby to effect pitch adjustment of said blades.

3. In a rotary wing aircraft of the propulsion jet type wherein the blades are provided with air compressing means, the combination of a hub, a plurality of hollow blades extending from said hub, means located within at least two of said blades for compressing air, means for driving said air compressing means, propulsion jet means on said last named blades communicating with said air compressing means for causing said blades to rotate about a substantially vertical axis, means connected with said hub and said blades for changing the pitch angle of said blades during the compression of air by said air compressing means, and means for changing the pitch of said blades comprising a rotatable sleeve means carried by the blades which carry air compressing means and extending into the hub of said blades and being coaxially arranged with relation to said blade axes, said driving means extending vertically into said hubs and being laterally extended at least partially through said sleeves and connected with said air compressing means.

4. In a rotary wing aircraft of the propulsion jet type wherein the blades are provided with air compressing means, the combination of a hub, a plurality of hollow blades extending from said hub, means located within at least two of said blades for compressing air, means for driving said air compressing means, propulsion jet means on said last named blades communicating with said air compressing means for causing said blades to rotate about a substantially vertical axis, means connected with said hub and said blades for changing the pitch angle of said blades during the compression of air by said air compressing means, means for changing the pitch of said blades comprising a rotatable sleeve means carried by the blades which carry air compressing means and extending into the hub of said blades, said driving means extending vertically into said hub and being laterally extended at least partially through said sleeves and connected with said air compressing means, and means located externally of said hub and connected with said sleeve within said hub for rotating said sleeves to effect cyclic pitch changing.

5. In a rotary wing aircraft of the propulsion jet type wherein the blades are provided with air compressing means, the combination of a hub, a plurality of hollow blades extending from said hub, means located within at least two of said blades for compressing air, means for driving said air compressing means, propulsion jet means on said last named blades communicating with said air compressing means for causing said blades to rotate about a substantially vertical axis, means connected with said hub and said blades for changing the pitch angle of said blades during the compression of air by said air compressing means, means for changing the pitch of said blades comprising a rotatable sleeve means carried by the blades which carry air compressing means and extending into the hub of said blades and being coaxially arranged with relation to said blade axes, said driving means extending vertically into said hub and being laterally extended at least partially through said sleeves and connected with said air compressing means, and means located externally of said hub and connected with said sleeve within said hub for rotating said sleeves to effect cyclic pitch changing.

6. In a rotary wing aircraft of the propulsion jet type wherein the blades are provided with air compressing means, the combination of a hub, a plurality of hollow blades extending from said hub, means located within at least two of said blades for compressing air, means for driving said air compressing means, propulsion jet means on said last named blades communicating with said air compressing means for causing said blades to rotate about a substantially vertical axis, means connected with said hub and said blades for changing the pitch angle of said blades during the compression of air by said air compressing means, and means for changing the pitch of said blades comprising a rotatable sleeve means carried by the blades which carry air compressing means and extending into the hub of said blades, said driving means extending vertically into said hub and being laterally extended at least partially through said sleeves and connected with said air compressing means, said means for driving said air compressing means including means in the hub forming a fulcrum for said means for changing the pitch angle of said blades.

7. In a rotary wing aircraft of the propulsion jet type wherein the blades are provided with air compressing means, the combination of a hub, a plurality of hollow blades extending from said hub, means located within at least two of said blades for compressing air, means for driving said air compressing means, propulsion jet means on said last named blades communicating with said air compressing means for causing said blades to rotate about a substantially vertical axis, means including manually controlled mechanism connected with said hub and said blades for changing the pitch angle of said blades during the compression of air by said air compressing means, said means for changing the pitch of said blades comprising a rotatable sleeve means carried by the blades which carry air compressing means and extending into the hub of said blades, said driving means extending vertically into said hub and being laterally extended at least partially through said sleeves and connected with said air compressing means.

8. In a rotary wing aircraft the combination of a source of power, a substantially vertical drive shaft extending therefrom, a plurality of blades adapted to rotate in a substantially horizontal plane, each blade having a wing spar, a pump in each of at least two of said blades, the wing spar in each of said last-named blades comprising the cylinder of said pump, means for driving each pump from said shaft, and means for changing the pitch angle of said blades.

9. In a rotary wing aircraft the combination of a source of power, a substantially vertical drive shaft means extending therefrom, a plurality of blades adapted to rotate in a substantially horizontal plane, each blade having a wing spar, a pump in each of at least two of said blades, said pump having at least one cylinder, said cylinder being rapidly mounted with a wing spar, means for driving each pump from said shaft means, and means connected to said shaft means for rotating said blades in a substantially horizontal plane, means for simultaneously rotating each of said pump cylinders about their longitudinal axes whereby to effect pitch adjustment of said blades, and radial drive rods, said radial drive rods being radial to said vertical drive shaft and being adapted for driving said pump.

10. In a rotary wing aircraft the combination of a source of power, a substantially vertical drive shaft extending therefrom, a plurality of blades adapted to rotate in a substantially horizontal plane, each blade having a wing spar, a pump in each of at least two of said blades, the wing spar in each of said last-named blades comprising the cylinder of said pump, means for driving each pump from said shaft, and means for simultaneously rotating each of said pump cylinders about their longitudinal axes whereby to effect pitch adjustment of said blades, said pump driving means including radial drive rods extending radially from said vertical drive shaft and connecting said vertical drive shaft with each pump.

11. In a rotary wing aircraft the combination of a source of power, a substantially vertical drive shaft extending therefrom, a plurality of blades adapted to rotate in a substantially horizontal plane, each blade having a wing spar, a reciprocating pump in each of at least two of said blades, said pump having at least one cylinder, said cylinder being rigidly mounted with a wing spar, means for driving each pump from said shaft, means for simultaneously rotating each of said pump cylinders about their longitudinal axes whereby to effect pitch adjustment of said blades, and radial drive rods, said radial drive rods being radial to said vertical drive shaft and being adapted for driving said pump.

JOSEPH S. PECKER.

REFERENCES CITED

The following references are of record in the file of this patent:

UNITED STATES PATENTS

| Number | Name | Date |
|---|---|---|
| 1,519,444 | Fales | Dec. 16, 1924 |
| 1,897,092 | Weir | Feb. 14, 1933 |
| 1,913,644 | Stalker | June 13, 1933 |
| 1,923,054 | Holmes et al. | Aug. 15, 1933 |
| 1,942,674 | Whitsett | Jan. 9, 1934 |
| 1,980,233 | Stout | Nov. 13, 1934 |
| 1,982,969 | Stalker | Dec. 4, 1934 |
| 2,011,061 | Loescher | Aug. 13, 1935 |
| 2,021,481 | Dornier | Nov. 19, 1935 |
| 2,080,540 | Isaac | May 18, 1937 |
| 2,084,464 | Stalker | June 22, 1937 |
| 2,144,927 | Levasseur | Jan. 24, 1939 |
| 2,164,721 | Price | July 4, 1939 |

FOREIGN PATENTS

| Number | Country | Date |
|---|---|---|
| 227,151 | Great Britain | Jan. 12, 1925 |
| 595,915 | Germany | Dec. 4, 1932 |
| 412,487 | Great Britain | June 28, 1934 |
| 807,110 | France | Jan. 5, 1937 |
| 497,048 | Great Britain | Dec. 12, 1938 |